(12) United States Patent  
Kikuchi

(10) Patent No.: US 6,988,112 B2  
(45) Date of Patent: Jan. 17, 2006

(54) MULTI-PROGRAM PROCESSING SYSTEM AND ROLLBACK METHOD FOR FILE USED THEREFOR

(75) Inventor: Kenichi Kikuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 820 days.

(21) Appl. No.: 09/849,983

(22) Filed: May 8, 2001

(65) Prior Publication Data

US 2001/0049714 A1 Dec. 6, 2001

(30) Foreign Application Priority Data

May 31, 2000 (JP) ........................................ 2000-161351

(51) Int. Cl.  
*G06F 17/30* (2006.01)

(52) U.S. Cl. .......................... 707/202; 707/8; 709/201; 718/103

(58) Field of Classification Search ..................... 707/8, 707/202, 3, 6, 7, 9, 10, 100, 101, 102; 709/200, 709/201, 227, 248; 718/100, 103  
See application file for complete search history.

(56) References Cited

U.S. PATENT DOCUMENTS 4,123,795 A * 10/1978 Dean, Jr. et al. ............ 718/103  
5,666,533 A * 9/1997 Horiguchi et al. .......... 718/100  
5,933,838 A * 8/1999 Lomet ........................ 707/202  
6,233,617 B1 * 5/2001 Rothwein et al. ........... 709/227  
6,351,744 B1 * 2/2002 Landresse ...................... 707/8  
2001/0049714 A1 12/2001 Kikuchi

FOREIGN PATENT DOCUMENTS

JP        H10-293712        11/1998

* cited by examiner

*Primary Examiner*—Shahid Alam  
(74) *Attorney, Agent, or Firm*—Sughrue Mion, PLLC

(57) ABSTRACT

To provide a multi-program processing system, which prioritizes reference and update of a block to be an object of rollback without waiting for the rollback being finished and can improve efficiency of processing a program when one file is simultaneously referred to and updated by a plurality of programs. Even if the block is being updated by another program, a file I/O section requests a journal for the block from the journal sharing section instead of reading the block from a data file, and transfers the contents of the block in a state before it is updated by another program to the program if the block is being rolled back. In response to an update request from the program, the file I/O section also refers the block exclusion section for the state of a block as mentioned above, and if another program does not perform neither reference nor update, the file I/O section causes the journal collecting section to save a block before update in the journal file from the data file as a journal, and the data file is updated.

14 Claims, 5 Drawing Sheets

MULTI-PROGRAM PROCESSING SYSTEM AND ROLLBACK METHOD FOR FILE USED THEREFOR

BACKGROUND OF THE INVENTION

1. Field of the Invention

The present invention relates to a multi-program processing system and a rollback method for a file used therefor, and in particular related to a rollback method for a file in a multi-program processing system in which a plurality of programs can simultaneously operate.

2. Description of the Related Art

Conventionally, a plurality of programs can operate simultaneously in a multi-program processing system, and there are block exclusion and rollback as a function for protecting an important file against reference and update from the plurality of programs when one file is referred to and updated simultaneously by the plurality of programs.

The block exclusion is processing for preventing a certain file that is being referred to and updated by a program from being referred to and updated by another program until the reference and update by the certain program is finished.

In addition, the rollback is processing, in the case when the processing cannot be normally completed due to the occurrence of some abnormality during operation of a certain program, that is, the case in which a deadlock or an abnormal termination occurs, for stopping operations relating to the operation of the program to return information related thereto to a state before operation.

However, since any program is equally handled in the block exclusion in the above-mentioned conventional file protecting function. Therefore, when the rollback is performed due to a deadlock or an abnormal termination of a program, even if there is a block required next, the block cannot be referred to and updated until completing the rollback if the block is the block being an object of the rollback.

SUMMARY OF THE INVENTION

Thus, it is an object of the present invention to provide a multi-program processing system and a rollback method of a file used therefor which solves the above-mentioned problems, can prioritize the reference and update of a block to be an object of rollback without waiting for the completion of the rollback and can improve the efficiency of processing a program when one file is simultaneously referred to and updated by a plurality of programs.

A multi-program processing system according to the present invention is a multi-program processing apparatus in which a plurality of programs operate simultaneously, which comprises exclusion control means for applying exclusion control to a file to be an object of reference to and update of the plurality of programs by the unit of a block and retaining means for temporarily retaining a block before update corresponding to a block being updated by the programs, wherein, while either a deadlock or an abnormal termination occurs in a certain program and updates up to then are rolled back, reference and update to a block to be an object of the rollback from another program are allowed using the block temporarily retained in the retaining means.

A rollback method of a file according to the present invention is a rollback method of a file in a multi-program processing system in which a plurality of programs can operate simultaneously, wherein, while exclusion control is applied to a file to be an object of reference and update of the plurality of programs by the unit of a block and either a deadlock or an abnormal termination occurs in a certain program and updates up to then are rolled back, reference and update to a block to be an object of the rollback from another program are allowed using a block temporarily retained in retaining means for temporarily retaining a block before update corresponding to a block being updated by the program.

That is, the rollback method of a file of the present invention is to provide means, when a file is referred to and updated simultaneously in a plurality of programs by applying exclusion control by the unit of a block, for, even while a deadlock or an abnormal termination occurs in a certain program and updates up to then is rolled back, allowing reference and update of a block to be an object of rollback from another program.

Basic operations to be preconditions of the present invention will be described first more specifically. File I/O means of the present invention processes reference and update requests for data file from a program. In addition, the file I/O means requests block exclusion means to inquire if a block to be an object of reference and update is available among programs and if a deadlock occurs and to register a utilization situation.

The block exclusion means references and updates a block state table according to a request. If a block is available and a request from programs is reference, the file I/O means reads a target block from a data file and return it to the program. In addition, if a request is update, the file I/O means causes journal collecting means to save a block before update in a journal file from the data file as a journal, and thereafter updates the data file.

If a deadlock occurs in a reference and update request from a program or a program finishes abnormally, the rollback means cancels the update by writing back journals accumulated up to then from the journal file to the data file.

Operations in the present invention will now be described. In the present invention, reference and update of a target block of a program is allowed for another program even in the case in which the rollback is performed as described below.

If a deadlock or an abnormal termination occurs in a program B, the rollback means starts rollback after causing the block exclusion means to apply a mark indicating that the block B is being rolled back to the referred to and updated block.

If a reference to a data file is requested form a program A, the file I/O means refer to the block exclusion means of the block. If the block is not updated by the program B, operations are the same as the above-mentioned basic operations. However, if the block is updated, the file I/O means requests a journal for the block to the journal sharing means instead of reading the block from the data file, obtains a block before being updated by the program B from the journal file and transfers it to the program A.

In addition, in the case in which update of a data file is requested from the program A, if, as a result of referring to the block exclusion means of the block by the file I/O means, the block is not updated by the program B, operations are also the same as the above-mentioned basic operations. However, if the block is updated by the program B, update of the block is marked again indicating that it is updated by the program A to make rollback of the program b unnecessary.

Thereafter, instead of the journal collecting means reading a block before update from the data file, a journal for the block is obtained from the journal file by the journal sharing means to be saved in the journal file as update by the program A.

On the other hand, rollback means writes journals accumulated in the journal file back to the data file, which refers to the block exclusion means to find whether or not the block has been updated by another program. If another program has updated the block, rollback for the block is unnecessary and, if it has not updated the block, rollback is applied to the block.

As described above, by applying exclusion control to one file by the unit of a block, when rollback is performed by a deadlock or an abnormal termination of a program, it becomes possible to prioritize reference and update of a block to be an object of rollback without waiting for the rollback to be finished, and it also becomes possible to improve an efficiency of processing a program when one file is referred to and updated simultaneously in a plurality of programs.

DESCRIPTION OF THE PREFERRED EMBODIMENT

Figure 1:
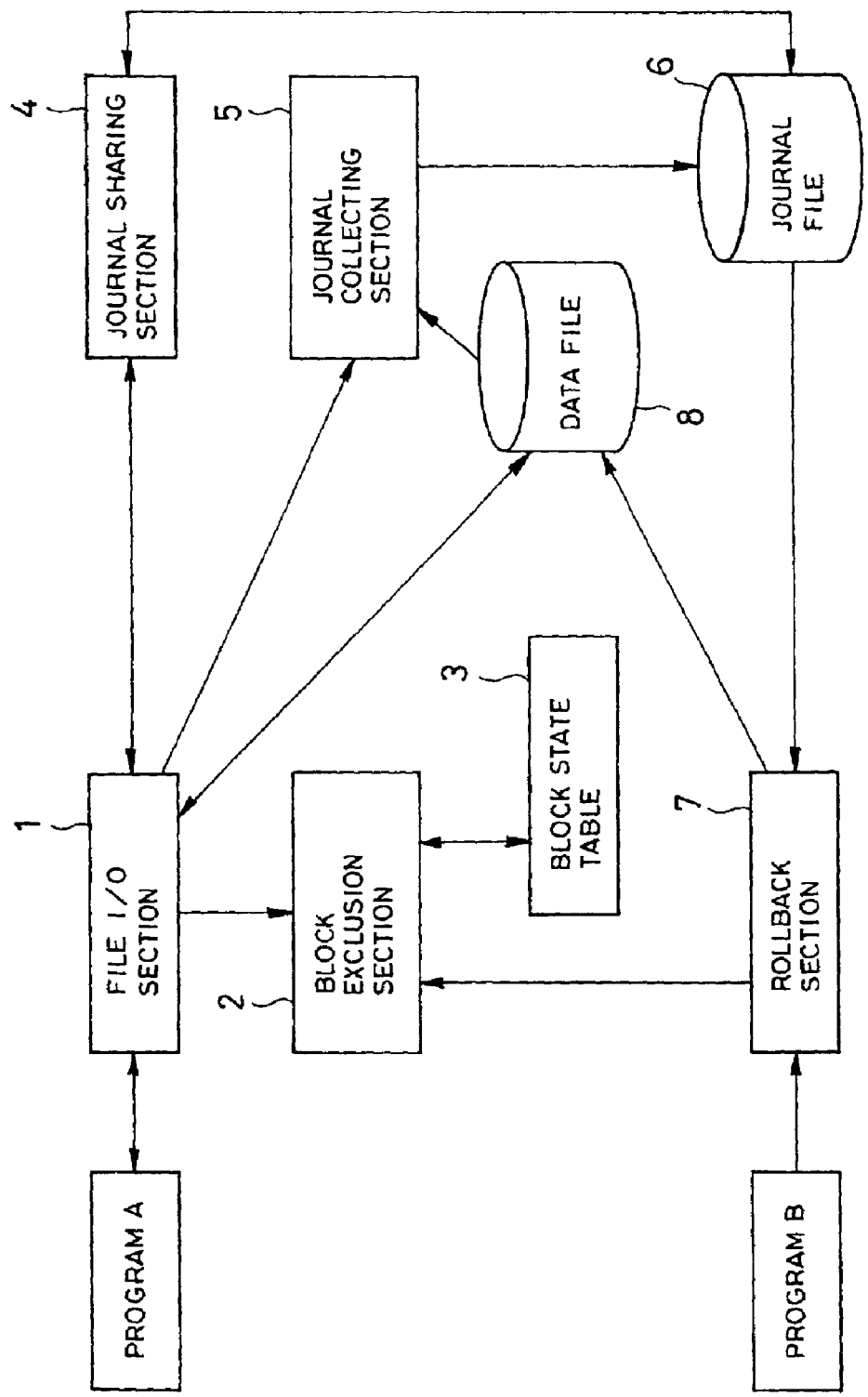
FIG. 1 is a block diagram showing a configuration of a multi-program processing system according to an embodiment of the present invention.

An embodiment of the present invention will now be described with reference to drawings. FIG. 1 is a block diagram showing a configuration of a multi-program processing system according to the embodiment of the present invention. In FIG. 1, the multi-program processing system according to the embodiment of the present invention comprises a file I/O (input and output) section 1, a block exclusion section 2, a block state table 3, a journal sharing section 4, a journal collecting section 5, a journal file 6, a rollback section 7, and a data file 8, in which a plurality of programs can operate simultaneously.

The block exclusion section 2 records file identification information for each data file, a relative block number in a file for each block, program identification information, and a mark indicating whether rollback is proceeding or not in the block state table 3.

The file I/O section 1, in response to a reference request from a program, first refers to the block exclusion section 2 for the state of the block. The block exclusion section 2 confirms whether the block on the block state table 3 is referred to and updated, or whether there is a mark indicating that rollback is proceeding even if the block is updated by another program.

If the block is not updated, the block exclusion section 2 stores the relative block number in a file and the program identification information, and reads the block from the data file 8 by the file I/O section 1 to transfer it to the program.

If the block is being updated by another program, the block exclusion section 2 has a request of the program waited.

As a result, if a deadlock is likely to occur, the block exclusion section 2 rejects the request of the program. Further, since the request of the block exclusion section 2 to have the program waited or detailed operations of processing for detecting a deadlock are outside the scope of description of the present invention, their description is omitted.

Even if the block is being updated by another program, the file I/O section 1 requests a journal for the block from the journal sharing section 4 instead of reading the block from the data file 8, and transfers the content of the block in a state before it is updated by another program to the program if the block is being rolled back.

In response to an update request from the program, the file I/O section 1 also refers the block exclusion section 2 for the state of a block as mentioned above. If another program performs neither reference nor update, the file I/O section 1 causes the journal collecting section 5 to save a block before update in the journal file 6 from the data file 8 as a journal. Thereafter, the data file 8 is updated.

Even if another program is updating the block, the file I/O section 1 replaces program identification information with that of a program of a requesting party, and obtains a block before update from the journal file 6 by the journal sharing section 4 to save it as new update from the program to update the data file 8 if the block is being rolled back. Further, the rollback section 7 recognizes that rollback of the block is unnecessary as described later by replacing the program identification information.

If a deadlock is detected or a program is abnormally finished in the block exclusion section 2, the rollback section 7 performs rollback of data file, then the rollback section 7 first causes the block exclusion section 2 to apply a mark indicating that the program is being rolled back to the updated block.

Subsequently, the rollback section 7 obtains a journal from the journal file 6, refers to the block exclusion section 2 for each block to determine whether another program has already updated the block or not. The rollback section 7 rolls back the block if the block is not updated or regards rollback unnecessary if it is updated.

Figure 2:
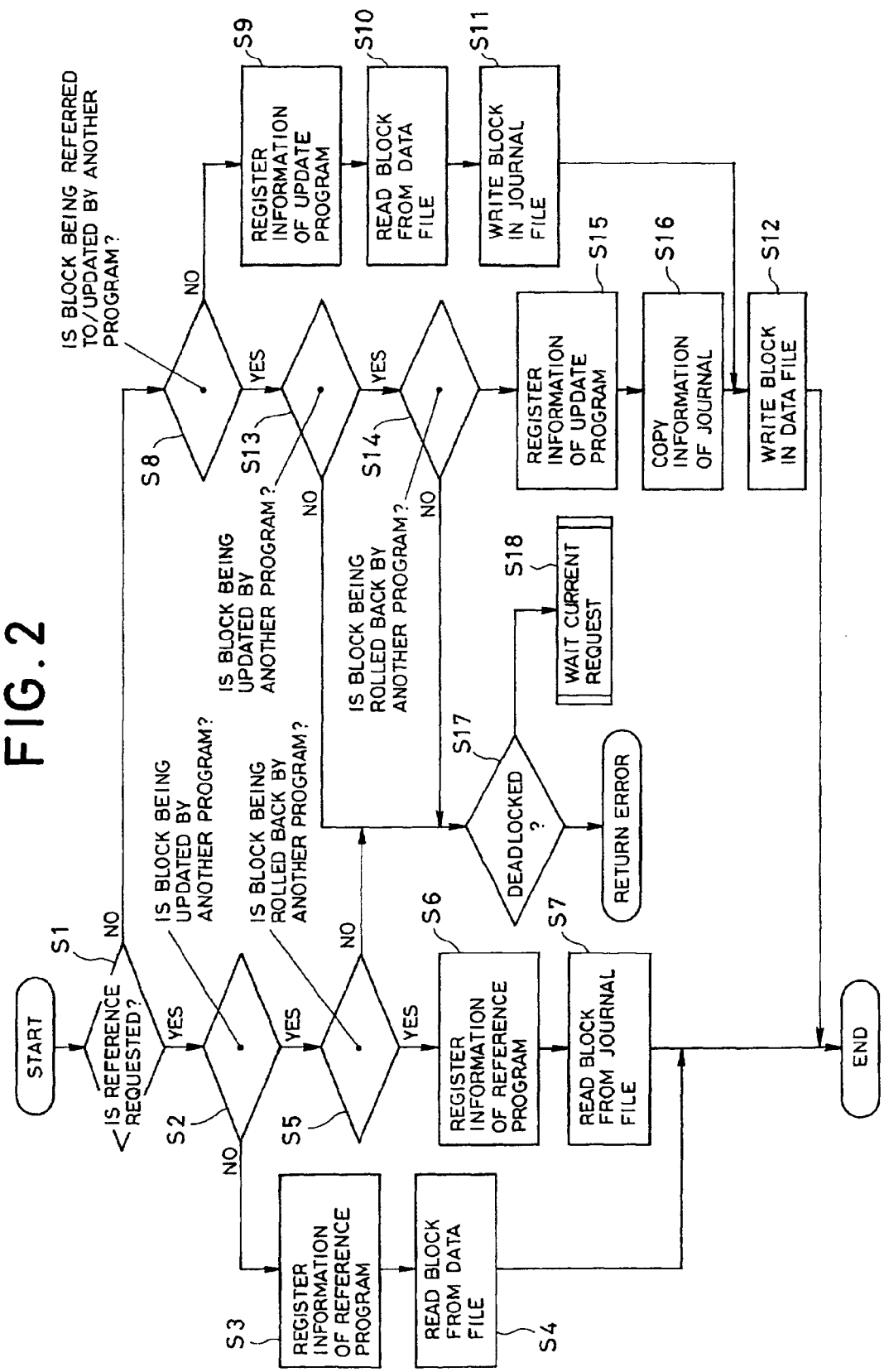
FIG. 2 is a flow chart showing operations of the multi-program processing system according to an embodiment of the present invention.
Figure 3:
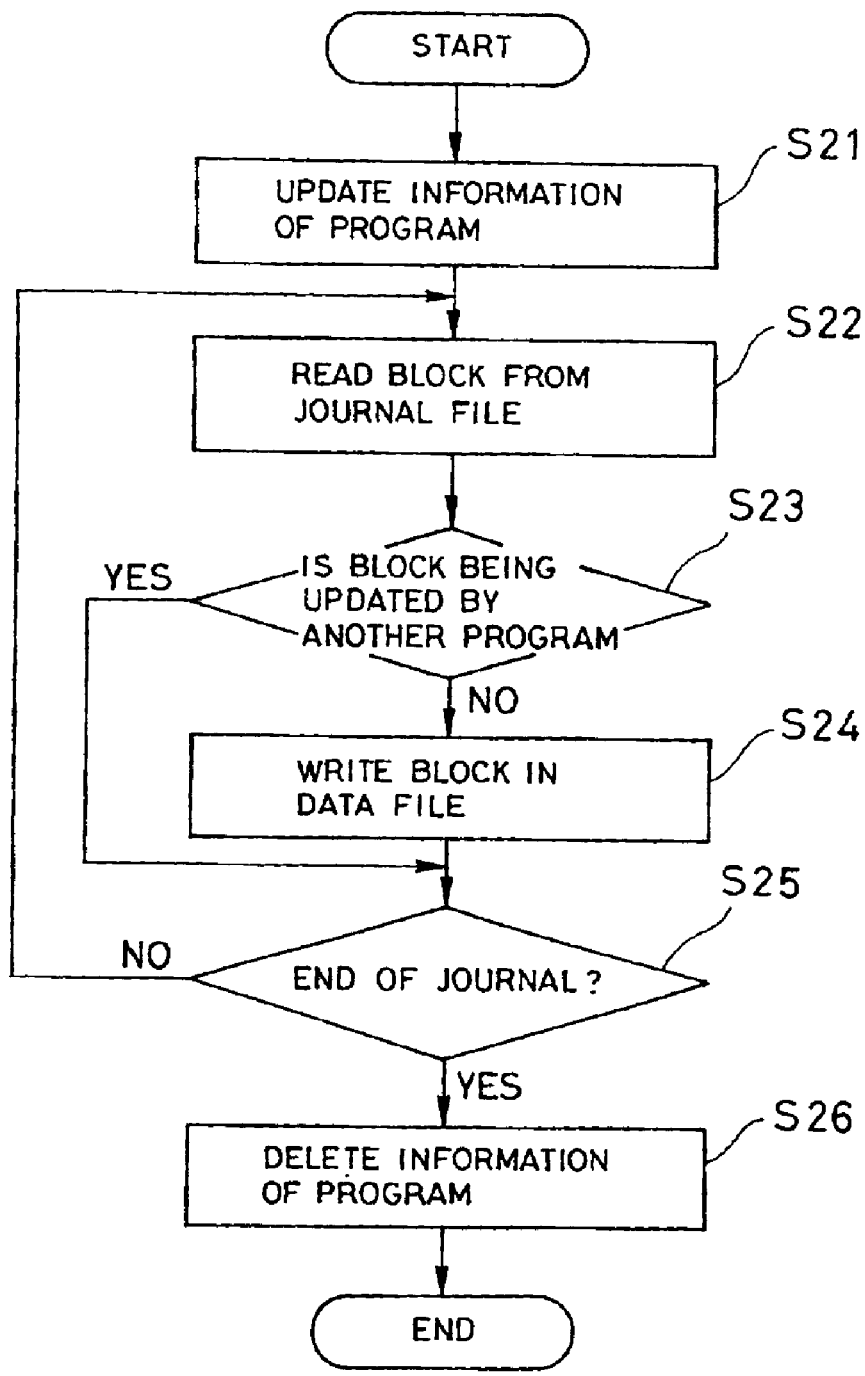
FIG. 3 is a flow chart showing operations of the multi-program processing system according to an embodiment of the present invention.

FIGS. 2 and 3 are flow charts showing operations of a multi-program processing system according to the embodiment of the present invention. The operations of the multi-program processing system according to the embodiment of the present invention will be described with reference to FIGS. 1 to 3.

When the program A attempts to input/output the data file 8, the file I/O section 1 determines whether it is reference or update (step S1 of FIG. 2). If it is reference, the block exclusion section 2 refers to the block state table 3 to determine whether the block is being updated by, for example, the program B (step S2 of FIG. 2).

If the block is not being updated by the program B, the block exclusion section 2 registers information of the program A in the block state table 3 (step S3 of FIG. 2) and the file I/O section 1 reads the block from the data file 8 (step S4 of FIG. 2) to return it to the program A.

If the block is being updated by the program B, the block exclusion section 2 further determines whether the block is being rolled back (step S5 of FIG. 2). If the block is not being rolled back, the block exclusion section 2 has the current reference request waited or detects a deadlock to return an error (steps S17 and S18 of FIG. 2).

If the block is being rolled back, the block exclusion section 2 registers the information of the program A in the block state table 3 as described above (step S6 of FIG. 2), and the journal sharing section 4 reads a block of a state before updated by the program B from the journal file 6 (step S7 of FIG. 2) to return it to the program A.

In addition, if the request from the program A is update, the block exclusion section 2 refers to the block state table 3, thereby determining whether or not the block is being referred to or updated by the program B (step S8 of FIG. 2).

If the block does not fall into any of the above-mentioned states, the block exclusion section 2 registers the information of the program A in the block state table 3 (step S9 of FIG. 2) and, after the journal collection section 5 reads the block before update from the data file 8 and saves it in the journal file 6 (steps S10 and S11 of FIG. 2), the file I/O section 1 writes a new block on the data file 8 (step S12 of FIG. 2).

If the block is not being updated by the program B, that is, it is being referenced (step S13 of FIG. 2), the block exclusion section 2 has the current update request waited or detects a deadlock to return an error (steps S17 and S18 of FIG. 2).

If the block is being updated by the program B, the block exclusion section 2 further determines whether the block is being rolled back or not (step S14 of FIG. 2). If it is not being rolled back, the block exclusion section 2 has the current update request waited or detects a deadlock to return an error (steps S17 and S18 of FIG. 2).

If the block is being rolled back, the block exclusion section 2 determines that the program being updating the block is the program A and registers it in the block state table 3 again (step S15 of FIG. 2), and the journal sharing section 4 determines that the block in the state before updated by the program B is updated by the program A and registers it in the journal file 6 again (step S16 of FIG. 2). Thereafter, as described above, the file I/O section 1 writes a new block on the data file 8 (step S12 of FIG. 2).

On the other hand, if a deadlock or an abnormal termination occurs in the program B, the rollback section 7 causes the block exclusion section 2 to apply a mark indicating that the block updated in the block state table 3 is being rolled back to the block (step S21 of FIG. 3). Thereafter, although the rollback section 7 reads a journal being the block before update from the journal file 6 and writes it back to the data file 8 (steps S22 and S24 of FIG. 3), the block may have already been updated by the program A by applying the mark indicating the block is being rolled back earlier.

In this case, it is not necessary to roll back the block (step S23 of FIG. 3). In any case, the journals for the updated part of the program B are all processed (step S25 of FIG. 3) and, thereafter, the block exclusion section 2 deletes the information of the program B from the block state table 3 (step S26 of FIG. 3).

Figure 4:
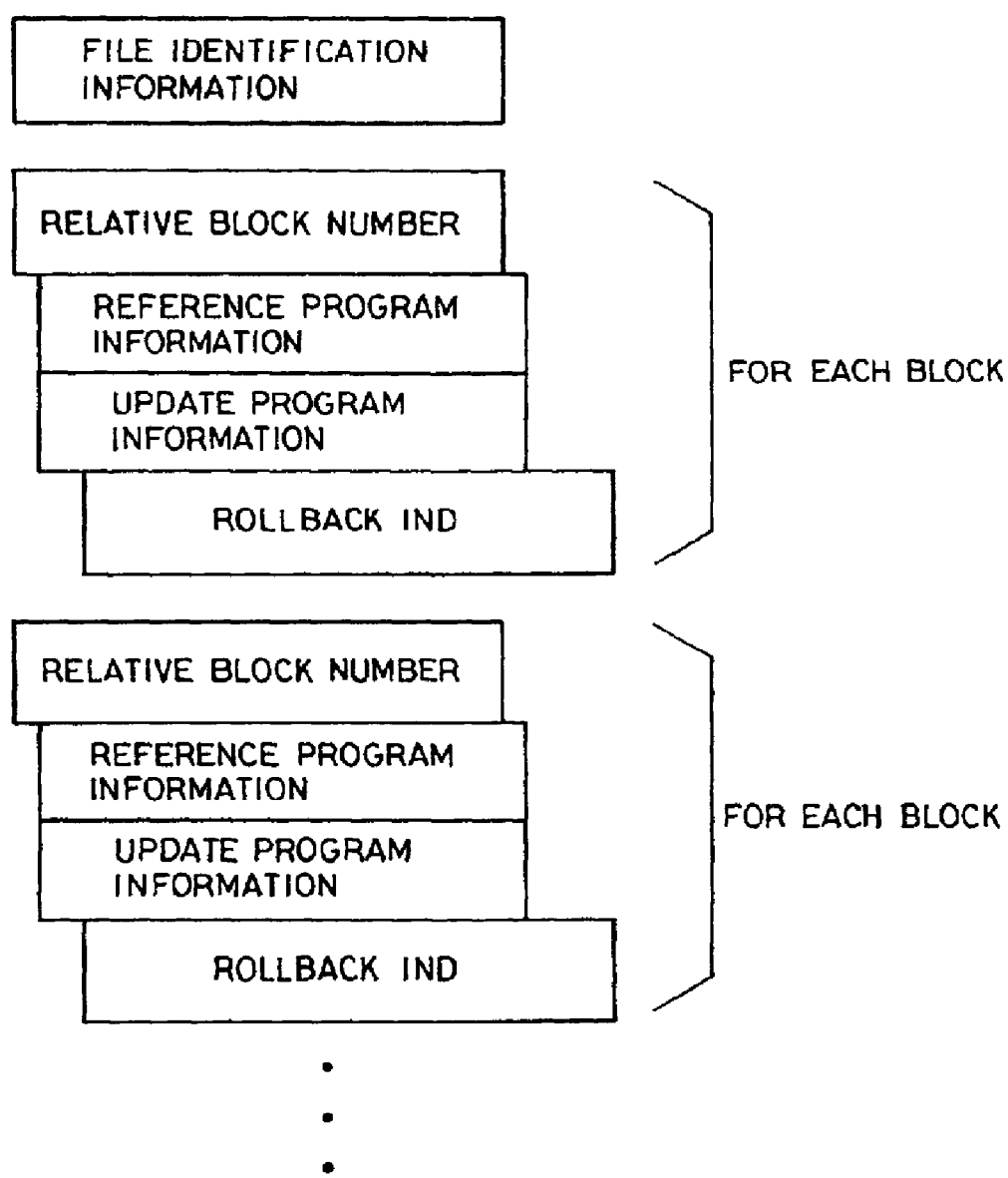
FIG. 4 is an illustration showing an example of a configuration of a block state table of FIG. 1.

FIG. 4 is an illustration showing an example of a configuration of the block state table 3 of FIG. 1. In FIG. 4, file identification information for each file, a relative block number for each block, reference and update program information, and a mark indicating whether a block is being rolled back or not are stored in the block state table 3.

Figure 5A:
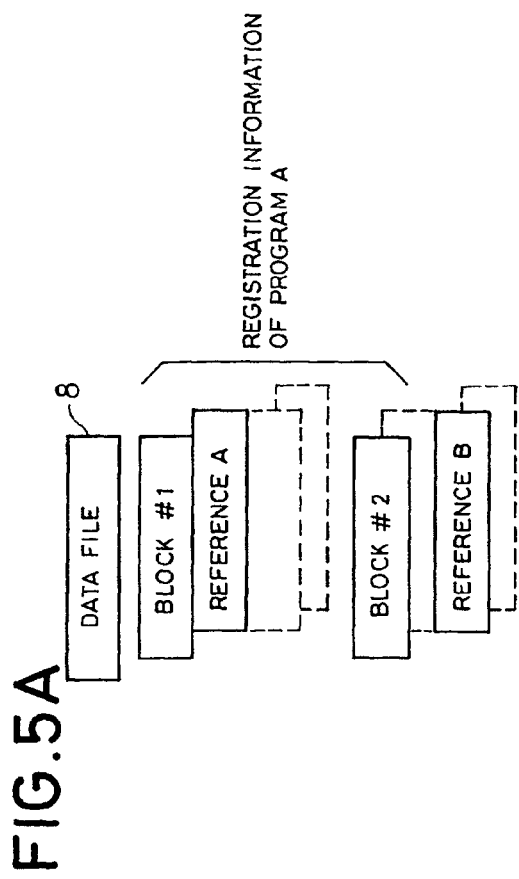
FIGS. 5A and 5B are illustrations showing operations of the multi-program processing system according to an embodiment of the present invention.
Figure 5B:
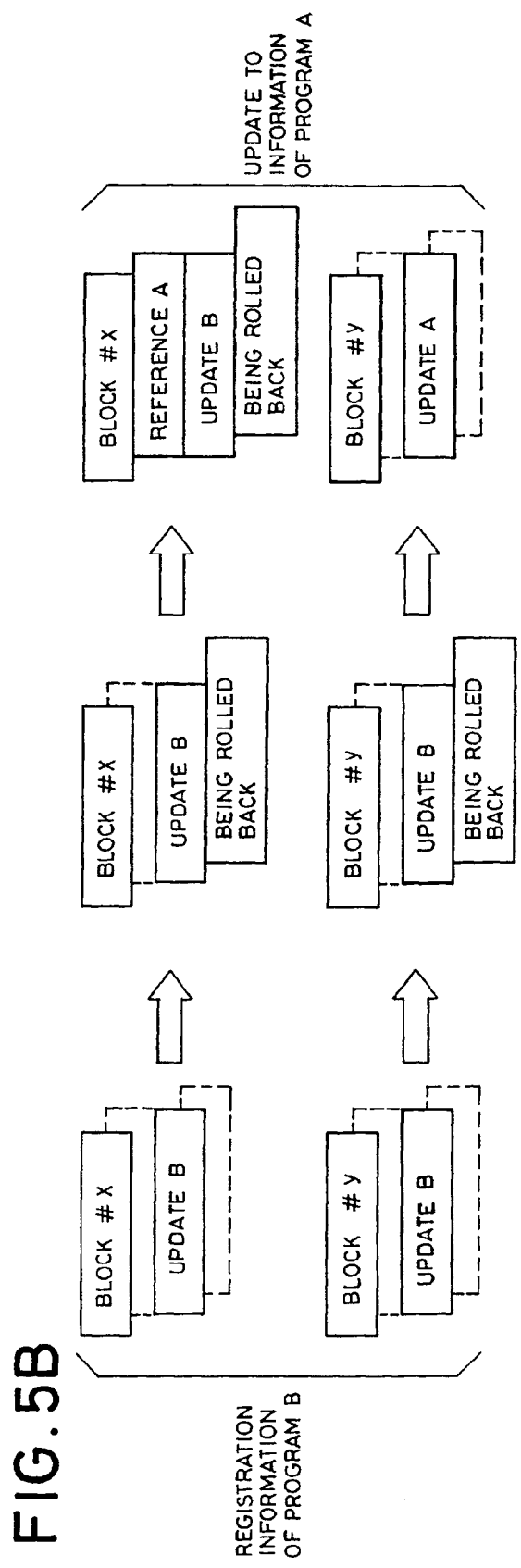

FIGS. 5A and 5B are illustrations showing operations of the multi-program processing system according to the embodiment of the present invention. The multi-program processing system according to the embodiment of the present invention will be described in detail with reference to FIGS. 4 and 5.

The program A refers to a block #1 of the data file 8 and updates the block #2 from the state in which there is no other program that is referring to or updating the data file 8, the block state table 3 is as shown in FIG. 5A (steps S1 to S4, S8 to S12 of FIG. 2). Further, information of parts that are not set is represented by dotted lines in FIGS. 5A and 5B.

Subsequently, when the program B updates blocks #x and #y, the block state table 3 is as shown in FIG. 5B. When the program B is abnormally finished and rollback is started from this state, a mark indicating that the block updated by the program B is being rolled back is applied to the block (step S21 of FIG. 3), and the block state table 3 is as shown in FIG. 5B.

Moreover, when the program A attempts to refer to the block #x, since the block #x is marked as being rolled back, the reference to the program A is accepted (steps S5 and S6 of FIG. 2). At this point, the block #x is not the data file 8, but is read from the journal file 6 in the state before it is updated by the program B (step S7 of FIG. 2).

In addition, when the program A attempts to update the block #y, since the block #y is also marked as being rolled back, the update of the program A is accepted (steps S13 to S15 of FIG. 2). At this point, the block before the update is not obtained from the data file 8, but is obtained from the journal file 6 (step S16 of FIG. 2). The state in the right most side of FIG. 5B shows the state when the program A refers to the block #x and updates the block #y.

When rollback to the program B is performed, rollback is performed for the block #x but is not performed for the block #y (steps S22 to S25 of FIG. 3).

In this way, when rollback is performed due to a deadlock or an abnormal termination of a program by applying exclusion control to one file by the unit of a block, referent to and update of a block to be an object of the rollback can be prioritized without waiting for the rollback to be finished, thus, when a plurality of programs simultaneously refers to and updates one file, efficiency of processing the programs can be improved.

As described above, according to the present invention, in a multi-program processing system in which a plurality of programs operate simultaneously, exclusion control is applied to a file to be an object of reference and update of the plurality of programs by the unit of a block, and reference to and update of a block to be an object of the rollback from another program are allowed using the block temporarily retained in the retaining means for temporarily retaining a block before update corresponding to a block being updated by the programs while either a deadlock or an abnormal termination occurs in a certain program and updates up to then are rolled back, thus, there are effects in that the reference to and update of the block to be an object of the rollback thereby can be prioritized without waiting for the rollback to be finished, and that, when a plurality of programs simultaneously refers to and updates one file, efficiency of processing the programs can be improved.

What is claimed is:

1. A multi-program computer processing system in which a plurality of programs can operate simultaneously, comprising:

exclusion control means for applying exclusion control to a file to be an object of reference to and update of said plurality of programs by a unit of a block; and retaining means for temporarily retaining the block before update corresponding to the block being updated by the programs, wherein while either a deadlock or an abnormal termination occurs in a certain program and updates up to then are rolled back, reference and update to a block to be an object of said rollback from another program are allowed by using said block temporarily retained in said retaining means.

2. The multi-program processing system according to claim 1, further comprising:

a block state table for retaining program identification information for specifying a program that is utilizing said block for each block of said file and information indicating whether or not said block is being rolled back, wherein said exclusion control means performs said exclusion control according to recorded contents of said block state table.

3. The multi-program processing apparatus according to claim 1, further comprising:

rollback means for writing a block before update temporarily retained in said retaining means back to a file corresponding to said block to cancel update when either said deadlock or said abnormal termination occurs in a reference and update request from said program.

4. The multi-program processing apparatus according to claim 1, wherein said rollback means makes rollback to a block unnecessary if said block is updated by another program, and performs rollback to said block if said block is not updated by said another program.

5. A rollback method of a file in a multi-program computer processing system in which a plurality of programs can operate simultaneously, wherein, while exclusion control is applied to a file to be an object of reference and update of said plurality of programs by the unit of a block and either a deadlock or an abnormal termination occurs in a certain program and updates up to then are rolled back, reference and update to a block to be an object of said rollback from another program are allowed using a block temporarily retained in retaining means for temporarily retaining a block before update corresponding to a block being updated by said program.

6. The rollback method of a file according to claim 5, wherein said exclusion control is performed according to recorded contents in a block state table for retaining program identification information for specifying a program that is utilizing said block for each block of said file and information indicating whether or not said block is being rolled back.

7. The rollback method of a file according to claim 5, wherein a block before update temporarily retained in said retaining means is written back to a file corresponding to said block to cancel update when either said deadlock or said abnormal termination occurs in a reference and update request from said program.

8. The rollback method of a file according to claim 5, wherein rollback to a block is made unnecessary if said block is updated by another program, and rollback to said block is performed if said block is not updated by said another program.

9. The multi-program processing system according to claim 1, wherein if a target block is available and a request from said program is reference, said target block is read from a data file in which said file to be an object of reference and update is stored, and is returned to said program.

10. The multi-program processing system according to claim 1, wherein if a target block is unavailable and a request from said program is reference, said target block is read from said retaining means instead of reading said target block from a data file in which said file to be an object of reference and update is stored.

11. The multi-program processing system according to claim 1, wherein if a request from said program is update, a block before update is saved from a data file in which said file to be an object of reference and update is stored, to said retaining means and said data file is updated thereafter.

12. The rollback method of a file according to claim 5, wherein if a target block is available and a request from said program is reference, said target block is read from a data file in which said file to be an object of reference and update is stored, and is returned to said program.

13. The rollback method of a file according to claim 5, wherein if a target block is unavailable and a request from said program is reference, said target block is read from said retaining means instead of reading said target block from a data file in which said file to be an object of reference and update is stored.

14. The rollback method of a file according to claim 5, wherein if a request from said program is update, a block before update is saved from a data file in which said file to be an object of reference and update is stored, to said retaining means and said data file is updated thereafter.

* * * * *